(12) United States Patent
Takehara et al.

(10) Patent No.: US 8,369,196 B1
(45) Date of Patent: Feb. 5, 2013

(54) BCA RECORDING ON OPTICAL RECORDING MEDIUM

(75) Inventors: Shintaro Takehara, Clarks Summit, PA (US); James J. Musto, Pittston, PA (US); Dominick A. Dallaverde, Pittston Township, PA (US)

(73) Assignee: Cinram International Inc., Scarborough (CA)

( * ) Notice: Subject to any disclaimer, the term of this patent is extended or adjusted under 35 U.S.C. 154(b) by 0 days.

(21) Appl. No.: 13/100,513

(22) Filed: May 4, 2011
(Under 37 CFR 1.47)

Related U.S. Application Data

(60) Provisional application No. 61/331,250, filed on May 4, 2010.

(51) Int. Cl.
*G11B 7/00* (2006.01)

(52) U.S. Cl. .................. 369/53.1; 369/275.4

(58) Field of Classification Search .......... 369/275.2, 369/275.3, 44.27, 53.22, 47.1, 47.28, 53.1, 369/275.4, 5.31, 53.44, 53.2, 53.41, 47.27
See application file for complete search history.

(56) References Cited

U.S. PATENT DOCUMENTS

| | | | |
|---|---|---|---|
| 4,647,947 A | 3/1987 | Takeoka et al. |
| 4,995,799 A | 2/1991 | Hayashi et al. |
| 5,181,081 A | 1/1993 | Suhan |
| 5,315,107 A | 5/1994 | Smith et al. |
| 5,371,792 A | 12/1994 | Asai et al. |
| 5,617,408 A | 4/1997 | Nishizawa et al. |
| 5,706,047 A | 1/1998 | Lentz et al. |
| 5,766,359 A | 6/1998 | Sichmann et al. |
| 5,766,495 A | 6/1998 | Parette |
| 5,792,538 A | 8/1998 | Yurescko-Suhan |
| 5,800,687 A | 9/1998 | Kempf |
| 5,863,328 A | 1/1999 | Sichmann et al. |
| 5,900,098 A | 5/1999 | Mueller et al. |
| 5,913,653 A | 6/1999 | Kempf |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,949,752 A | 9/1999 | Glynn et al. |
| 5,958,651 A | 9/1999 | Van Hoof et al. |
| 5,995,481 A | 11/1999 | Mecca |

(Continued)

FOREIGN PATENT DOCUMENTS

| | | |
|---|---|---|
| EP | 0802527 A1 | 10/1997 |
| JP | 2004-164758 * | 6/2004 |

(Continued)

OTHER PUBLICATIONS

U.S. Appl. No. 11/726,968, filed Mar. 22, 2007 of Lewis Gensel et al.

(Continued)

*Primary Examiner* — Nabil Hindi
(74) *Attorney, Agent, or Firm* — Cooper & Dunham LLP

(57) ABSTRACT

A burst cutting area of an optical recording disc includes a BCA mark comprising a plurality of pits over which a reflective layer is formed. The plurality of pits may be arrayed according to a pit pattern specifying a predetermined nominal positional relationship between adjacent pits. The pit pattern may comprise microstripes which include one pit per pit track and most adjacent pits in adjacent pit tracks. A direction between adjacent pits within each of the microstripes may correspond to a nominal microstripe direction which may form an angle with a pit track direction within a range of 45° to 135°.

18 Claims, 7 Drawing Sheets

U.S. PATENT DOCUMENTS

| | | | |
|---|---|---|---|
| 5,997,976 A | 12/1999 | Mueller et al. |
| 6,028,620 A | 2/2000 | Yin |
| 6,052,465 A | 4/2000 | Gotoh et al. |
| 6,081,785 A | 6/2000 | Oshima et al. |
| 6,117,284 A | 9/2000 | Mueller |
| 6,124,011 A | 9/2000 | Kern |
| 6,160,787 A | 12/2000 | Marquardt, Jr. et al. |
| 6,261,403 B1 | 7/2001 | Gerigk et al. |
| 6,285,762 B1 | 9/2001 | Gotoh et al. |
| 6,309,496 B1 | 10/2001 | Van Hoof |
| 6,309,727 B1 | 10/2001 | Mueller et al. |
| 6,361,845 B1 | 3/2002 | Kern |
| 6,414,920 B1 | 7/2002 | Lee |
| 6,453,420 B1 | 9/2002 | Collart |
| 6,527,538 B1 | 3/2003 | Pickutoski et al. |
| 6,546,193 B1 | 4/2003 | Um et al. |
| 6,608,804 B2 | 8/2003 | Shim |
| 6,641,886 B1 | 11/2003 | Bakos et al. |
| 6,708,299 B1 | 3/2004 | Xie |
| 6,726,973 B2 | 4/2004 | Mueller |
| 6,728,181 B2 | 4/2004 | Shimoda et al. |
| 6,814,825 B2 | 11/2004 | Becker et al. |
| 6,885,629 B2 | 4/2005 | Oshima et al. |
| 6,891,788 B2 | 5/2005 | Yumiba et al. |
| 6,894,962 B1 | 5/2005 | Nishiuchi et al. |
| 6,896,829 B2 | 5/2005 | Kern et al. |
| 7,200,102 B2 * | 4/2007 | Irie et al. .................. 369/275.3 |
| 7,325,287 B2 | 2/2008 | Sweeney |
| 7,355,929 B2 * | 4/2008 | Watanabe et al. ......... 369/13.38 |
| 7,419,045 B2 | 9/2008 | Kelsch |
| 7,535,806 B2 | 5/2009 | Fumanti |
| 7,564,771 B2 | 7/2009 | Sweeney |
| 7,578,389 B1 | 8/2009 | Haas |
| 7,637,713 B1 | 12/2009 | Parette |
| 7,684,309 B2 | 3/2010 | Mueller |
| 7,906,194 B2 | 3/2011 | Pickutoski et al. |
| 7,910,191 B1 | 3/2011 | Mueller et al. |
| 8,130,619 B2 * | 3/2012 | Lee .............................. 369/59.25 |
| 2001/0033517 A1 | 10/2001 | Ando et al. |
| 2003/0031109 A1 | 2/2003 | Lee et al. |
| 2004/0071060 A1 | 4/2004 | Suh et al. |
| 2004/0076101 A1 | 4/2004 | Suh et al. |
| 2004/0125722 A1 | 7/2004 | Feehan et al. |
| 2004/0228245 A1 | 11/2004 | Lee |
| 2005/0154905 A1 | 7/2005 | Kojima et al. |
| 2006/0023598 A1 | 2/2006 | Babinski et al. |
| 2006/0104190 A1 | 5/2006 | Babinski |
| 2006/0114803 A1 | 6/2006 | Ootera et al. |
| 2006/0114807 A1 | 6/2006 | Ootera et al. |
| 2006/0165419 A1 | 7/2006 | Musto |
| 2006/0181706 A1 | 8/2006 | Sweeney |
| 2006/0270080 A1 | 11/2006 | Rinaldi |
| 2006/0274617 A1 | 12/2006 | Musto et al. |
| 2007/0090006 A1 | 4/2007 | Kelsch |
| 2008/0223743 A1 | 9/2008 | Lenkeit |
| 2009/0127142 A1 | 5/2009 | Rothstein et al. |
| 2010/0014408 A1 | 1/2010 | Musto et al. |
| 2010/0074094 A1 | 3/2010 | Sakamoto et al. |
| 2010/0129586 A1 | 5/2010 | Mueller |
| 2011/0019527 A1 | 1/2011 | Mueller et al. |

FOREIGN PATENT DOCUMENTS

WO     WO98/58368     12/1998

OTHER PUBLICATIONS

U.S. Appl. No. 11/936,625, filed Nov. 7, 2007 of Petrus Hubertus Van Hoof.

U.S. Appl. No. 12/965,270, filed Dec. 10, 2010 of William R. Mueller et al.

U.S. Appl. No. 13/028,709, filed Feb. 16, 2011 of Jeff Williams.

U.S. Appl. No. 13/053,439, filed Mar. 22, 2011 of Lewis Robert Gensel, Jr. et al.

* cited by examiner

BCA RECORDING ON OPTICAL RECORDING MEDIUM

TECHNICAL FIELD

This application relates to optical recording media. In particular, the application relates to forming a burst cutting area (BCA) mark comprising a plurality of pits.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is prerecorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as BD (which includes read-only, recordable and rewritable formats). The popularity of optical storage media driven by advancements in computer, information communication and multimedia technologies has been accompanied also by demands for a higher density and a greater capacity of optical storage media. BD format media provide high density storage which attempts to meet such demands.

In addition, optical media having plural information layers readable from the same side (for example DVD-9) or readable from both sides (for example, DVD-10 and DVD-18), as well as hybrid optical media which include a combination of formats, are also available.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface in an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master. A metallized glass master is used in an electroforming process to form (typically, metal) stampers which are in turn used in injection molding of a plural of optical recording discs.

In the molding process, a stamper is used on one side of an injection molding cavity to emboss an information layer of pits and lands on a transparent polymer substrate formed by injection molding. The information bearing surface of the substrate is then covered with a reflective film (of metal or alloy) or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include a recording layer, and in addition a reflective layer (of metal or alloy) and a protective layer, and may include other layers. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly form a pattern of marks or pits into the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside or alongside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer, and art may be applied to at least one surface. During recording of the rewritable optical medium, the laser selectively heats and allows cooling of tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

BD format discs, like other disc formats, may be manufactured according to a variety of manufacturing processes. For example, in one example, BD format discs may be manufactured by injection molding a nominal 1.1 mm substrate with pits and sputtering a reflective layer over the pits to form an information layer, and applying a nominal 0.10 mm transparent cover layer over the information layer. Other approaches may instead be used for manufacturing BD format discs.

Further, BD format discs may be provided with two or more information layers. The two or more information layers may be configured to be read from a same side, as in the example of a single sided dual layer BD disc or a single sided BD-DVD disc. Alternatively, the two or more information layers may be configured to be read from both sides of the disc, as in the example of a dual sided BD disc or a dual sided BD-DVD disc.

In addition, various types of other hybrid optical media are available. For example, one type of hybrid media has data pit patterns prerecorded on a surface of a substrate and has in addition a recording layer allowing a user to record data to the recording layer. Further, optical recording media having multiple recording layers are now also available. In addition, in another hybrid optical recording disc a read-only area and a recordable area are present on one side of the hybrid optical disc, with a wobble groove in the read-only area modulated by depressions in the substrate and extending into the substrate in the recordable area. Each of the hybrid optical media has one or more reflective films (of metal or alloy) or the like.

The high capacity of optical recording media, coupled with recent enhancements to personal computers and the advent of recordable optical media technology, renders optical media popular for illicit use. For example, unauthorized copying of proprietary and/or copyrighted, recorded content from optical media to optical media on a large scale (also referred to as "piracy") is a growing concern. The piracy typically entails using software on a computer system having an optical medium drive to copy content from a recorded optical medium onto recordable media such as CD-R or CD-RW (or DVD-R, DVD-RW or DVD+RW) discs.

Many copy protection techniques and devices have been proposed to limit copying of content on optical media. Several of the proposed copy protection techniques are discussed in commonly-owned U.S. application Ser. No. 10/903,099, filed Jul. 30, 2004 and entitled METHOD AND APPARATUS FOR PROTECTING AGAINST COPYING OF CONTENT RECORDED ON OPTICAL RECORDING MEDIA, the entire contents of which are incorporated by reference herein.

Some optical recording media have a burst cutting area (BCA) which is specified by the standards or specifications which govern those types of optical recording media. For example, some format specifications include provisions for a burst cutting area that is intended for copy protection use. In other format specifications, the burst cutting area is used on each disc for a disc identifier which uniquely identifies the disc.

For example, the DVD specification, which specifies the format of data on DVDs, provides for an optional Burst Cutting Area (BCA) inside of the lead-in area of a DVD, between an inner circumference of 22.3 mm+0/−0.4 mm and to an outer circumference of 23.5 mm+/−0.05 mm from the center of the center hole of a disk. The BCA in a DVD is typically used by forming one or more marks (such as a copy protection mark or code) or a bar code (such as a unique serial code for the DVD) utilizing a YAG laser, power laser (Annex K), high power laser diode, etc. by selectively removing portions of a reflective layer. It has been proposed to use the serial codes for tracking DVDs to aid copy prevention. The DVD specification does not preclude the possibility of repeating the same mark on multiple discs of the same title.

The BD specification, as another example, provides for a BCA between the radii of 21.0 mm and 22.2 mm, generally. A schematic representation of a BD optical disc 10 is illustrated in FIG. 1. The BCA 12 is shown in the form of a ring around the central spindle hole 14 of the disc 10 and a plurality of BCA marks 16 are recorded within the BCA 12. The data area 18 of the disc 10 is generally located in an area of the disc 10 further from the central spindle hole 14 than the BCA 12.

Content Protection for Recordable Media (CPRM) is an option found in some DVD recorders that write DVD-RW and DVD-RAM discs using the DVD Video Recording format (DVD-VR). Such an option allows material specifically flagged "copy once" to be written to a single disc but prevents that disc from then being further duplicated. This restriction is accomplished by binding the content to the particular disc through encryption employing, amongst other information, a code (media identifier) unique to each writable disc compliant with the CPRM system. Such code is inserted into the Burst Cutting Area (or Narrow Burst Cutting Area or NBCA in the case of a DVD-RW) of the disc, to keep the disc from being further duplicated by a DVD recorder.

U.S. Pat. Nos. 6,608,804, 6,641,886, 6,885,629, 6,891,788 and 6,894,962 discuss assorted uses of a burst cutting area and types of information which can be written in the burst cutting area. Some conventional techniques for writing and processing of data in a burst cutting area are discussed in U.S. Pat. Nos. 6,052,465, 6,081,785, 6,414,920, 6,453,420, 6,546,193, 6,708,299, 6,728,181, and in International Publication No. WO98/58368. The entire contents of each of U.S. Pat. Nos. 6,052,465, 6,081,785, 6,414,920, 6,453,420, 6,546,193, 6,608,804, 6,641,886, 6,708,299, 6,728,181, 6,885,629, 6,891,788 and 6,894,962, and International Publication No. WO98/58368 are incorporated herein in order to more fully illustrate the state of the art as of the date of the subject matter described herein.

Conventionally, as discussed in, for example, U.S. Pat. No. 6,285,762, which is hereby incorporated by reference in its entirety, marks have been applied to a burst cutting area after the injection molding stage by cutting a mark with a low contrast relative to the remainder of the disc, onto the reflective layer of the disc. In one such example, described above, a high power laser is used to selectively remove portions of a reflective layer, leaving areas of normal reflectance and areas of minimal or no reflectance. These approaches require either an offline process to apply the mark to the burst cutting area or an inline BCA writer. Marks are typically placed in the burst cutting area on DIVX discs, DVD discs and Gamecube discs using these techniques. However, each process adds cost and time to the process and the large expense of BCA marking equipment (approximately $500 k per BCA writer).

It has been proposed that the BCA mark may be embossed in a substrate by a stamper. However, there is a need to reliably meet a minimum contrast threshold, required according to specifications, for various formats, between a reflective portion of the BCA and a portion of the BCA intended as a BCA mark. Such requirements have not been met by any heretofore known techniques.

SUMMARY

This disclosure provides techniques for formatting a burst cutting area (BCA) mark prior to molding of an optical recording disc. The optical disc formed using the techniques of this disclosure comprises an information carrying area, a burst cutting area, and a BCA mark formed in the burst cutting area.

In an aspect, the BCA mark comprises a plurality of pits arrayed within the BCA mark. A light reflectivity of BCA mark is less than a light reflectivity outside the BCA mark.

In another aspect, a BCA mark comprises a plurality of pits arrayed according to a predetermined pit pattern and along at least two pit tracks. The pit pattern describes a positional relationship between pits adjacent to one another in adjacent pit tracks. The pit pattern may be configured to enhance contrast between a light reflectivity of the BCA mark and light reflectivity outside the BCA mark.

In yet another aspect, a BCA mark comprises a plurality of pits arrayed along two or more pit tracks according to a pit pattern which specifies microstripes of pits. Each microstripe includes one pit per pit track and pits in adjacent pit tracks which are most adjacent to each other are allocated to the same microstripe.

In one example, pits within each microstripe are aligned to one another along a microstripe direction. The microstripe direction may form an angle with the pit track direction that is with a range of range of 45° to 135°.

In a further aspect, a BCA mark comprises a plurality of pits and each pit in the BCA mark may be configured with the same nominal pit length measured along the pit track direction.

In still another aspect, a plurality of pits comprised in a BCA mark are each spaced apart from one other in a pit track direction by a land region. Each land region may be configured with the same nominal land length measured along the pit direction.

In still another aspect, a nominal pit length common to each pit in a plurality of pits comprising a BCA mark is longer than a nominal land length common to each land region separating the plurality of pits from each other. Similarly, a sum of all pit lengths within a BCA mark may be greater than a sum of all land lengths within the BCA mark.

In still another aspect, a BCA mark comprises a plurality of pits arrayed along two or more pit tracks. The pit tracks may be separated in a radial direction by a distance that is less than or equal to a corresponding pit track separation in a data area of the optical recording disc.

In still another aspect, a BCA mark may comprise a plurality of pits embossed into an information layer by a stamper.

BRIEF DESCRIPTION OF THE DRAWINGS

The features of the present application can be more readily understood from the following detailed description with reference to the accompanying drawings wherein.

DETAILED DESCRIPTION

The following discussion of exemplary embodiments of the techniques of this application is set forth to aid in an understanding of the subject matter of this disclosure, but is not intended, and should not be construed, to limit in any way the scope of this disclosure. Therefore, while specific terminology is employed for the sake of clarity in describing some exemplary embodiments, the present disclosure is not intended to be limited to the specific terminology so selected, and it is to be understood that each specific element includes all technical equivalents thereof.

The techniques of this disclosure include adding data to a burst cutting area (BCA) prior to molding which can be readable by the optical disc drive, such as for authentication purposes. This application provides tools (in the form of methodologies, apparatuses, and systems) for applying one or more burst cutting area (BCA) marks prior to molding of the optical recording media, such as onto a mastering substrate, father, mother or stamper. The techniques of this disclosure may, for example, avoid the use of special-purpose BCA writer hardware (which cost approximately $500 k) when serialization is not needed.

The term "BCA mark" is used herein generally to denote any mark, cut or surface reflectance variation or grouping thereof serving for copy protection, disc identification or other information to be inserted in a burst cutting area (for example, BCA, NBCA, etc.) of a disc.

The term "BCA code" is used herein generally to refer to a collection of one or more BCA marks formed in the burst cutting area. It is known in the art (and it has been proposed) that the burst cutting area, BCA marks and BCA codes can be used for assorted purposes, including, for example, copy protection.

Figure 1:
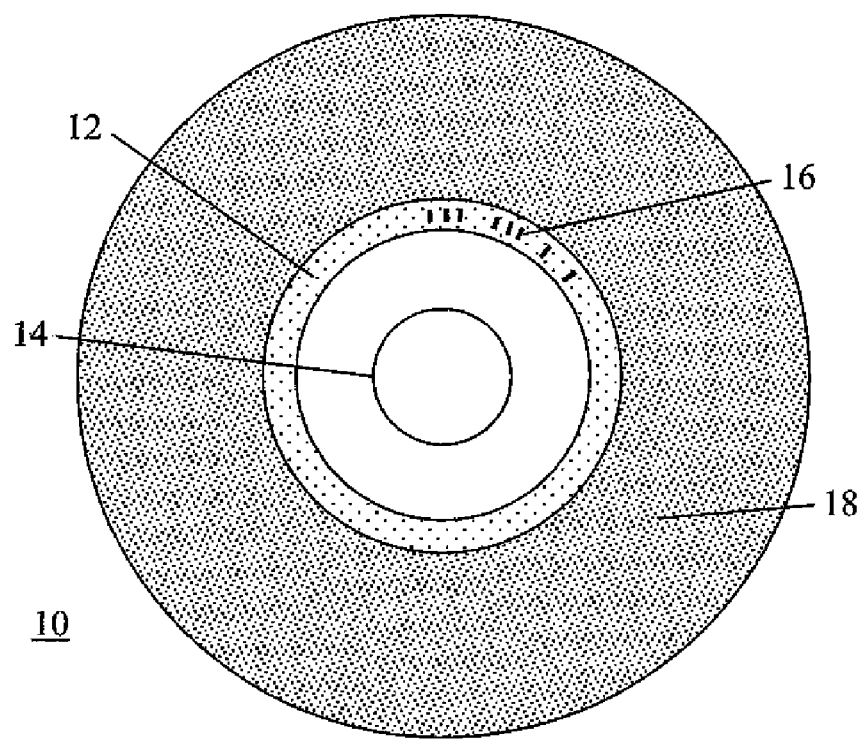
FIG. 1 shows a schematic representation of an exemplary optical disc, such as a BD disc.
Figure 2:
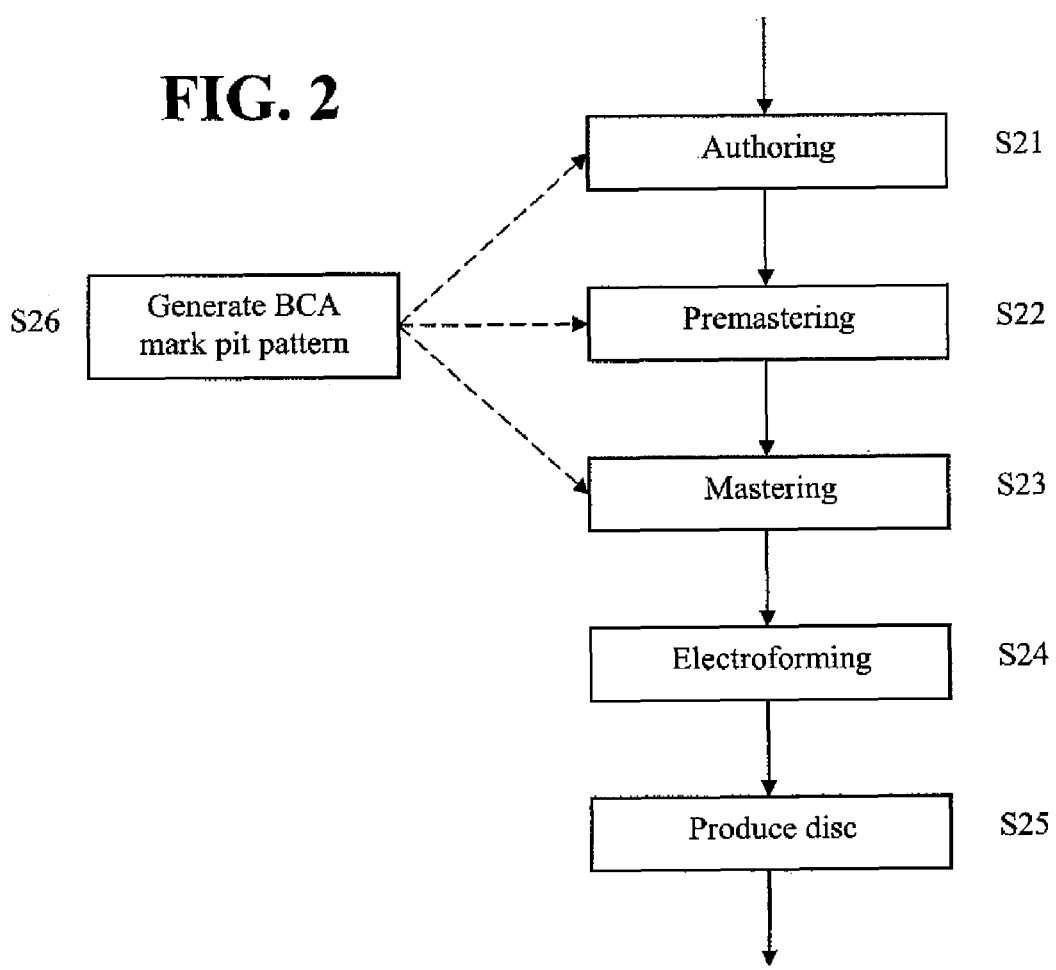
FIG. 2 shows a flow chart of a creation process for a read-only type optical recording disc, according to an exemplary embodiment.

An overview of optical recording disc creation, according to an exemplary embodiment, will be provided below with reference to FIG. 2.

Authoring (step S21) and pre-mastering (step S22) activities are performed in order to preprocess content into a suitable form for generating an appropriate disc image for replication of read-only type optical discs.

Preparation for applying a BCA mark may include generating (step S26) a BCA pit pattern for a plurality of pits comprising the BCA mark and applying the BCA mark to the disc image in pre-mastering S22. Alternatively, the BCA mark may be applied in the authoring step S21 or directly at the mastering step S23.

It should be understood, however, that the techniques of this application are not limited to creation of read-only type optical discs and can be applied to any optical recording disc which includes a burst cutting area, by applying a BCA mark or code prior to molding of the optical recording media.

Mastering (step S23) is a process, following pre-mastering S22 in the disc creation process, for creating a model, on a mastering substrate, of the final disc which is used for generating a stamper used in a mold for molding the optical media. Mastering includes reading a disc image (information) from a source media, and then formatting, encoding, and processing the information into a modulated data signal. The modulated data signal is used to control a laser beam recorder to form pits and other marks, such as the BCA mark, in a photoresist or a dye-polymer layer on an optical grade mastering substrate (of, for example, glass, silicon, etc.). As mentioned above, the BCA mark may be incorporated in the disc image and therefore the modulated data signal would cause the laser beam recorder to form the BCA mark in the mastering substrate. Alternatively, the BCA mark may be formed by the laser beam recorder in an additional pass over the mastering substrate, such as when the disc image does not include the BCA mark, or by another device for forming BCA marks.

In any event, the mastering substrate is covered with a metal layer (for example, silver), and the metallized mastering substrate is used in an electroforming process to form (typically, metal) stampers which are in turn used in the molding of a plural of optical recording discs. Alternatively, the mastering substrate may be used in an electroforming process to form stampers without first covering the mastering substrate with a metal layer.

In the electroforming process (step S24), a father is formed, for example, by placing the processed mastering substrate into a vessel containing a nickel sulphamate solution for a predetermined period of time (for example, two hours) during which a layer of nickel is grown onto the metallized surface of the mastering substrate, and at the end of which a sheet of nickel, constituting the father, is separated from the surface of the processed mastering substrate. The father is a reverse image of the data and can be used to stamp discs. As necessary, the father may be used to form a mother, by applying an electroforming process to the father to grow thereon a sheet of nickel constituting the mother. The mother is separated from the father and in turn used in an electroforming process to grow another sheet of nickel which constitutes the stamper. The stamper, like the father, is a reverse image of the data and therefore can be used in the injection molding of discs. Several stampers can be grown from a mother.

Figure 3:
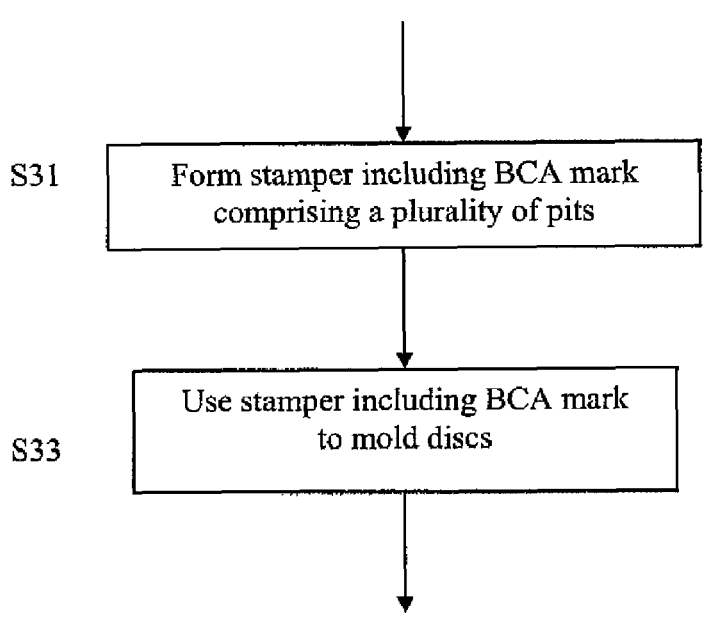
FIG. 3 shows a flow chart of a method for applying a BCA mark prior to molding of optical recording media, according to an exemplary embodiment of this disclosure.

A method for applying a BCA mark prior to molding of optical recording media, according to an exemplary embodiment (FIG. 3), includes forming a stamper including a BCA mark (step S31), and using the stamper including the BCA mark in the molding of optical recording discs (step S33).

A BCA mark can be formatted at the time of mastering by specifying a graphic mark that meets all of the physical specifications of BCA marking parameters such as width, length, spacing between marks, contrast, etc. The width, length, spacing, contrast, etc. may be adapted to accommodate contrast and shrinkage. The BCA mark can be mastered onto a mastering substrate and thereby allows all of the molded discs to contain the same BCA mark.

The laser beam recorder can be controlled appropriately to form such a mark during mastering. As one example, the mark may be formed by applying the laser beam recorder to a photosensitive resist layer on a mastering substrate during the mastering process. Alternatively, the BCA mark can be applied during the electroforming process to a father, mother or stamper, by using, for example, a YAG laser, and thereby avoid the need for BCA writer hardware for applying a BCA mark after the molding process.

After stampers are formed, a process (step S25) generally including the steps of molding, metallizing, printing and testing is performed.

Methodologies and apparatuses which can be used in a manufacturing process are discussed in U.S. Pat. Nos. 4,995, 799, 5,766,359, 5,766,495, 5,792,538, 5,863,328, 5,900,098, 5,913,653, 5,932,042, 5,932,051, 5,932,058, 5,935,673, 5,949,752, 5,958,651, 5,995,481, 5,997,976, 6,117,284, 6,124,011, 6,160,787, 6,261,403, 6,309,496, 6,309,727, 6,361,845, 6,440,248, 6,527,538 and 6,814,825, the entire contents of each of which are incorporated by reference herein.

The techniques of this disclosure can be applied to any of a broad range of optical discs, such as DVDs, high-density discs (for example BD), etc., including any of the formats.

As one example, the techniques of this disclosure may be applied to form stampers for use in molding optical discs that comply with the requirements of the BD read-only format. The stampers are used to form an information layer which includes a series of pits embossed in a plane of land, all of which being then covered by a reflective layer. Such an information layer typically comprises an information track having pits with a minimum length along the track in a range of 138 nm to 160 nm, and comprises information marks configured for reading using a laser with a wavelength in a range of 400 nm to 420 nm and a numerical aperture in a range of 0.84 and 0.86. The track pitch may be within a range of 30-34 μm. The burst cutting area of such a disc is in an annular region of the disc at an inner radius of 21.3(+0/−0.3) mm and outer radius of 22.0(+0.2/−0) mm.

Similarly, the techniques of this disclosure also may be applied to form stampers for use in molding optical discs that comply with the requirements of the DVD read-only format. The burst cutting area of such a disc is in an annular region of the disc at an inner radius of 22.3(+0/−0.4) mm and an outer radius of 23.50(+0.05/−0.05) mm.

In each instance, a BCA mark is formed in the stamper, and each disc molded using the stamper would also bear the BCA mark. The optical disc formed using the techniques of this disclosure comprises an information carrying area, a burst cutting area, and an embossed BCA mark formed at the burst cutting area. It will be recognized that the BCA mark may be embossed by the same stamper and at the same time as the information carrying area.

In one example of a disc reproduction apparatus, a laser light is directed towards an information layer of an optical disc. Light reflected from the information surface is received by a photo detector and analyzed. In a data area of the disc, as discussed in the background section, above, transition points between pits and lands may be detected and translated into the 1s and 0s representing the stored information.

When reading a BCA of a disc, however, a disc reproduction apparatus may be configured to analyze reflected light differently than when reading a data area of the disc. For example, when reading a BCA in which BCA marks are formed according to conventional methods (such as by removing portions of a reflective layer with a high power laser, described in the background section, above), the characteristics of light reflected from a conventional BCA mark will be different from light reflected from pits and lands in a data area of the disc. Accordingly, one approach for analyzing light reflected from a BCA is to apply a low pass filter (LPF) to a raw signal from a light detection sensor.

Figure 4:
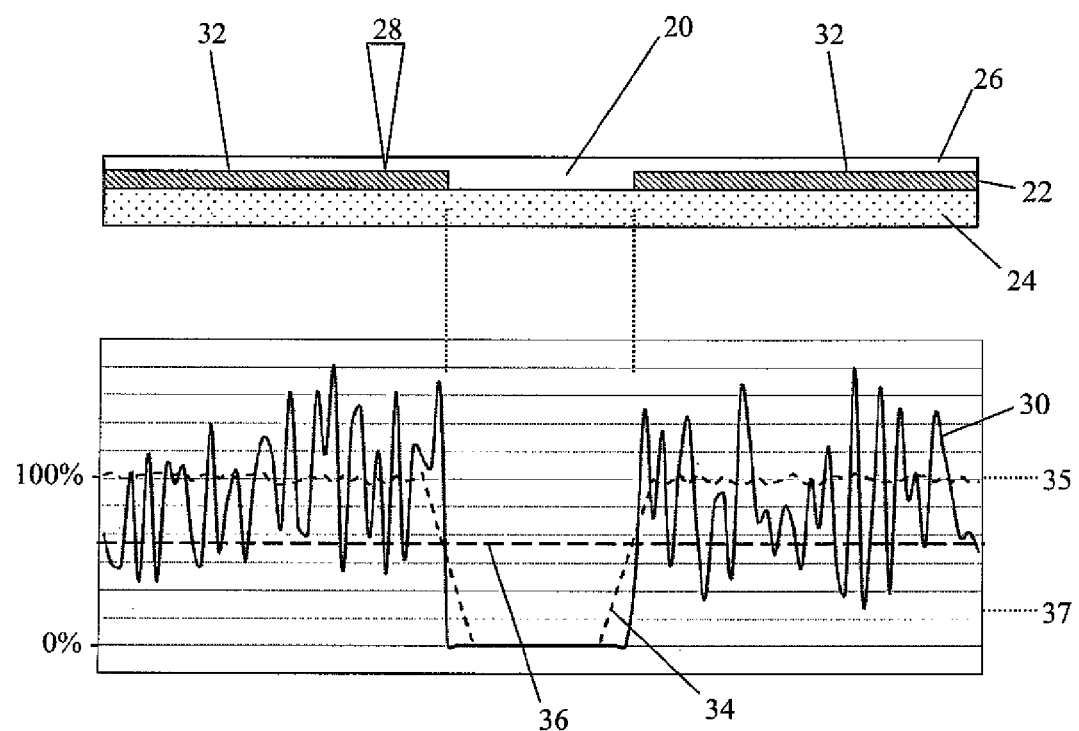
FIG. 4 shows a notional representation of a conventional BCA mark and signals corresponding to the detection of the conventional BCA mark.

FIG. 4 shows one example of signals corresponding to the detection of a conventional BCA mark formed by removing a portion 20 of a reflective layer 22 formed over a substrate 24 and under a protective layer 26. A BCA reading laser beam 28 is directed at the reflective layer 22 and sweeps across the surface of the reflective layer 22. As shown, an amount of light reflected (shown as a raw signal 30 from a photodetector) from areas outside 32 of a conventional BCA mark 20 may be considerably irregular, while the amount of light reflected from the conventional BCA mark 20 itself is negligible. The irregularities in light reflected from areas outside 32 the conventional BCA 20 may be caused by, for example, debris or other matter left over from the BCA mark formation process using a high powered laser. A LPF is applied to the raw detection signal 30 to obtain the LPF signal 34. Thus, a conventional BCA mark 20 may be detected by monitoring the LPF signal 34 to determine when the LPF signal has dropped below a predetermined threshold 36. The predetermined threshold 36 may be specified according to a disc format and may relate to a maximum value 35 of the LPF signal 34 or raw signal 30. The maximum value 35 may be read at a calibration area of the disc, at an area of the BCA not within the boundaries of a BCA mark, by sampling the BCA, data area, or some other area of the disc, etc.

In order to ensure that the LPF signal reliably drops below the predetermined threshold 36 in a BCA mark, various disc formats may specify a required signal level 37 that is lower than the predetermined threshold 36 for the LPF signal within the BCA mark. Accordingly, the predetermined threshold 36 may be specified as a fraction of the maximum LPF signal value 35 or may be specified in relation to the difference between the maximum LPF signal value 35 and the required signal level 37.

For example, a required signal level in a BCA mark according to a DVD format may be described as 80% of the maximum LPF signal value 35 and the predetermined threshold 36 may be configured between the maximum LPF signal value 35 and the required signal level 37. As another example, according to a BD format, the required signal level 37 in a BCA mark may be described as 50% of the maximum LPF signal value 35 and the predetermined threshold may be described as roughly 75% of the maximum LPF signal value 35 (or the required signal level 37 plus 50% of the difference between the maximum LPF signal value 35 and the required signal level 37).

Therefore, in a disc reproduction apparatus configured to read conventional BCA marks 20 by monitoring a LPF signal 34, a BCA mark comprising a plurality of pits may be substituted for the conventional BCA mark 20 so long as the LPF signal 34 drops below the predetermined threshold 36 and reaches a required signal level 37 (if applicable) when reading the plurality of pits comprising the BCA mark.

As discussed above, pits may be formed in a plane of lands. A BCA reading laser beam, which may be the same or different than the reading laser beam used to read a data area of a disc, may be directed at a BCA of an information layer of an optical disc. The amount of light reflected from an information layer comprising pits and lands varies depending on if the reading laser beam is positioned over a land, a pit, or a transition between a pit and a land.

Figure 5:
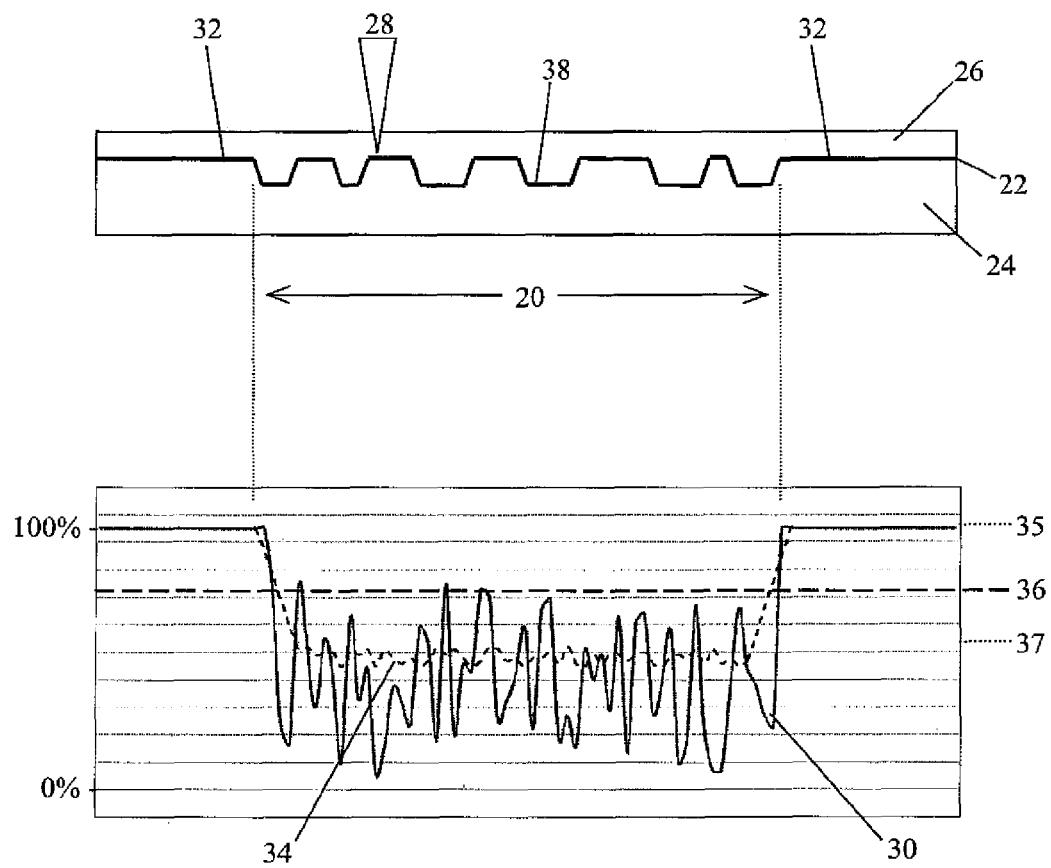
FIG. 5 shows a notional representation of a BCA mark comprising a plurality of randomly arrayed pits and signals corresponding to the detection of such a BCA mark.

FIG. 5 shows one example of signals detected when reading a BCA mark 20 formed by a plurality of pits 38. As shown, areas of pits and lands inside the BCA mark 20 produce a lower LPF signal 34 than areas of land 32 outside the BCA mark. Such contrast may be used to indicate the presence of a BCA mark.

In the example shown in FIG. 5, the BCA mark 20 has a length along a pit track direction which is longer than a longest pit length allowed by a specification for the pits in the data area of the disc. Also, in the example shown in FIG. 5, pits 38 are arbitrarily arrayed within the BCA mark 20 along a pit track. In this example, the amount of light reflected at an area of land 32 outside the BCA mark 20 is relatively consistent. Accordingly, the reflectivity of the area of land 32, also known as a mirror area, may be considered to be the highest reflectivity amount of the information layer of the disc. When the BCA reading laser beam 28 is directed to the BCA mark 20 comprising the plurality of arbitrarily arrayed pits, the raw signal 30 from a photodetector shows varying levels of light reflectance. Correspondingly, the LPF signal 34 drops when the reading beam 28 is positioned over the BCA mark 20.

The pits 38 comprising the BCA mark 20 may be standards-compliant pits. In other words, the pits 38 comprising the BCA mark 20 may conform to the same physical specifications of the pits formed in the data area of the disc. For example, the pits 38 comprising the BCA mark 20 may conform to the same nominal depth, width, length, track pitch, etc. requirements as pits in the data area.

It should be noted that any of the specific measurements, orientation directions or relationships, etc. referred to herein relating to any of the aspects of the optical recording disc, BCA marks, pits, etc. should be understood as nominal. Variances from nominal values are expected and/or unavoidable in many circumstances and are acceptable within relative ranges.

One way to arbitrarily array the pits within the BCA mark is to apply a random data modulation to a predetermined set of input data. As one example, a data source may be fed into a random modulation algorithm configured to apply a random multiplier to an input data point to obtain and record a random pit length configured to be less than a predetermined maximum pit length, insert a predetermined minimum land length (or a random land length obtained by a second random multiplier applied to input data configured to be greater than a predetermined minimum land length) and repeat until a desired BCA mark width is reached. In another example, pit lengths may all correspond to a predetermined nominal BCA pit length while land lengths may be randomly determined.

Successive radially spaced tracks may be randomly recorded according to the above algorithm until a desired BCA mark length (along a radial direction) is reached. Such random modulation algorithm may be applied during an authoring or mastering process, for example. As discussed above, such arbitrarily or randomly recorded pits may lower the LPF signal of a BCA reading laser beam inside the BCA mark to suitably replicate a conventional BCA mark for some applications or disc formats.

However, for applications requiring a greater contrast between the LPF signal outside a BCA mark and inside a BCA mark (or, in other words, a lower predetermined threshold value 36), a different algorithm may be used to array pits comprising the BCA mark which takes into account factors which adversely affect LPF signal contrast.

When a BCA reading laser beam is used to scan a BCA for BCA marks, the BCA reading laser beam may be held stationary at a predetermined radius which the disc is rotated about its axis or rotation. As the disc is rotated, BCA marks are read and communicated to various other components of the disc reproduction apparatus. Such BCA reading routine may include reading the BCA at more than one predetermined radius as a way to correctly detect the BCA marks even if the disc is dirty or scratched or if the BCA was not formed properly, for example. Thus, in one method for reading BCA marks, the BCA reading laser beam tracks may form one or more circles concentric about the disc's axis of rotation. Such circular BCA reading tracks may provide simplicity to a BCA reading routine intended for use with conventional BCA marks formed by removing relatively large radial stripes of a reflective material, but may also cause a loss of contrast when used to detect BCA marks formed by a plurality of pits.

For example, the plurality of pits comprising a BCA mark may be arrayed along a traditional spiral pit track originating at the disc's center and spiraling outwards with each revolution, maintaining a consistent and predetermined track pitch between successive revolutions of the spiral track. Such a spiral track configuration may provide convenience in the authoring and mastering processes, particularly if the track pitch of the spiral track used for the pits comprising the BCA mark is the same as the track pitch used for the pits in the data area of the disc. In such an example, a BCA mark may include within its boundary one or more portions of the spiral pit track. As a BCA mark may only include a small portion of the burst cutting area within its boundary, each portion of the spiral pit track within the BCA mark boundary may be considered a separate pit track for the purposes of clarity.

However, it will be recognized that a BCA reading laser beam, having generally a same spot diameter as a data area reading laser beam, will only intersect the spiral pit track once per revolution if the BCA reading track is a circle concentric with the disc's axis of revolution. Such a circular BCA reading track will also locate the BCA reading beam midway between spiral pit tracks once per revolution of the disc. Thus, the detected reflected light along the BCA reading track will be somewhat greater than if the pits comprising the BCA were to be read by moving the BCA reading laser beam along the spiral pit track. Such discrepancy effectively reduces contrast in the LPF signal, as areas which are intended to indicate a low amount of reflected light (BCA marks, e.g.) actually indicate a higher than intended amount of reflected light.

In one exemplary approach for overcoming this result, pits comprising a BCA mark may be formed along one or more circular pit tracks. Thus, the one or more circular pit tracks may be configured to mimic the one or more circular BCA reading tracks.

However, there is a possibility that the axis of the circular pit tracks does not identically correspond to an axis of rotation of the disc. For example, the pits comprising a BCA mark may be formed in a mastering substrate along a circular track concentric about an axis of the mastering substrate, but it is not always possible to maintain concentricity through all of the disc fabrication steps. In other words, the axis of the mastering substrate may not match a rotation axis of a final optical disc. While such eccentricity may be compensated for when reading the data area of the disc, through tracking algorithms and the like, no such tracking capabilities are generally provided for reading a BCA.

In yet another example, pits comprising a BCA mark may be recorded along spiral or circular pit tracks having a track pitch smaller than is allowed by a format specification for pits tracks in a data area of the disc. Because each individual pit in the BCA mark is not necessarily being read for its exact length or position, but rather for its effect on total surface reflectance, as indicated by the LPF signal, the minimum track pitch specification of the disc format for the data area (in which the exact length and position of each pit must be determined) may be violated. Accordingly, even if a BCA reading laser beam is located midway between pit tracks, the light reflected by the information layer may be reduced due to the close proximity of the adjacent pit tracks.

Figure 6:
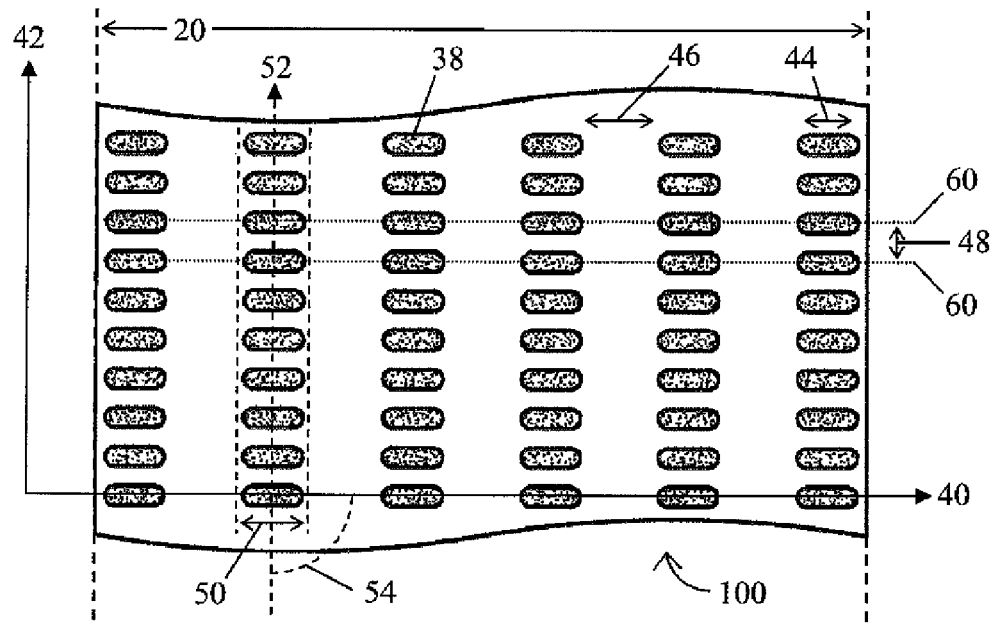
FIG. 6 shows a notional representation of one example of a BCA mark comprising a plurality of pits.

In another approach, pits comprising a BCA mark may be arrayed in a preconfigured pattern within a BCA mark. The preconfigured pattern, for example, may provide rules for determining the length of each pit or land region, the position of one pit in relation to adjacent pits, a track pitch between tracks of pits, etc. In describing the various pit patterns, it will be recognized that such descriptions may apply to both concentric circular pit tracks as well as spiral pit tracks. One exemplary pit pattern 100 is shown in FIG. 6. A plurality of pits 38 are arranged according to the pit pattern 100.

In describing the various pit patterns herein, reference is made to a track direction 40 and a radial direction 42, shown in FIG. 6. As used throughout this disclosure, "track direction" generally refers to a direction 40 tangential to pit tracks 60. However, as the pit patterns 100 described herein generally may be described with reference to a relatively small number of adjacent pits 38, the track direction will be assumed to approximate the pit tracks 60, even through the pit tracks 60 are, in reality, circular or spiral-shaped.

As used throughout this disclosure, "radial direction" generally refers to a direction 42 radiating outward from an axis of the disc, perpendicular to the track direction 40.

In the example shown in FIG. 6, all pits 38 within a BCA mark 20 are configured to have a same nominal BCA pit length 44 along the track direction 40. Similarly; all land regions between pits 38 within a BCA mark 20 may be configured to have a same nominal BCA land length 46 along the track direction 40. The nominal BCA pit and land lengths 44 and 46 may be configured to comply with the physical specifications of pits and land regions in the data area of the disc according to the disc format. A ratio of pit length to land length within the BCA mark may be configured to be greater than or equal to 50% pit length to land length, and more preferably greater than or equal to 60% pit length to land length (pits are longer than land regions), but is not limited to such ranges.

In addition, the BCA track pitch 48 may be varied, as discussed above, and may be configured to greater than, equal to, or less than the nominal track pitch specified by the disc format for the data area of the disc.

In addition to the relative lengths of the pits and land regions and the track pitch, the orientation of adjacent pits 38 may be configured according to a pit pattern. For example, most adjacent pits 38 in adjacent pit tracks 60 may be configured to align with one another to form microstripes 50. Microstripes 50 may be configured to be parallel to one another and to a microstripe direction 52. The microstripe direction 52 is a direction between adjacent pits 38 within a microstripe 50. An angle 54 between the microstripe direction 52 and the track direction 40 may preferably be configured within a range of 45° to 135°, but is not limited to such a range. As one example, shown in FIG. 6, the angle 54 between the microstripe direction 52 and the track direction 40 may be approximately 90°.

The microstripe direction 52 may be configured by adjusting any of the above parameters, such as pit length 44, land length 46, track pitch 48, etc. In addition, the microstripe direction 52 may be configured by determining, for each pit track 60 of the BCA mark, a length of pit or land adjacent to the BCA mark boundary 56.

Figure 7:
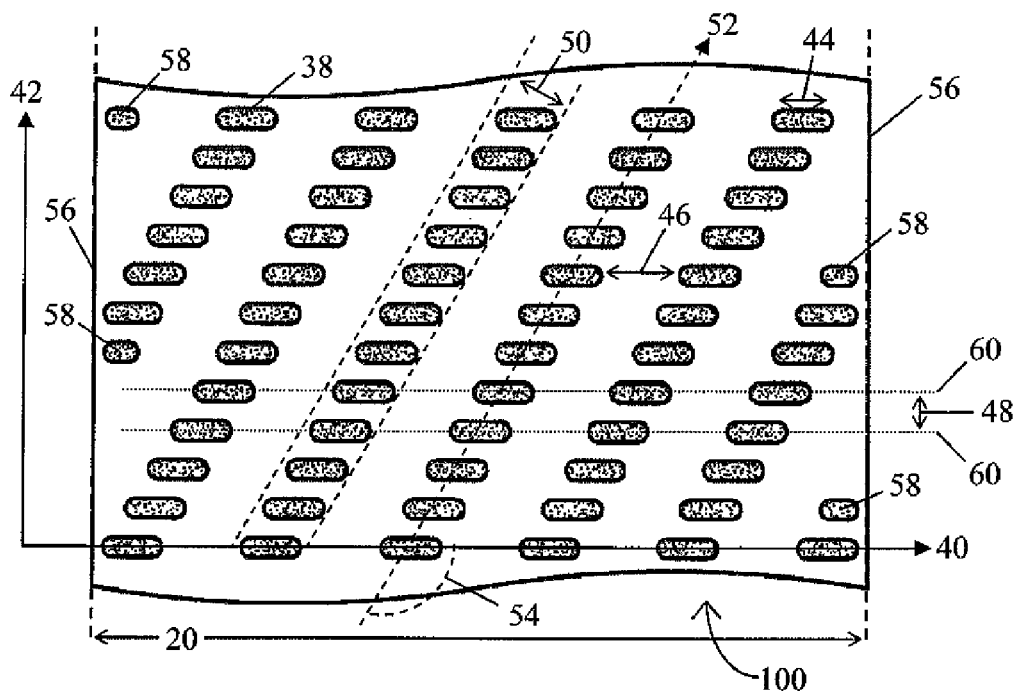
FIG. 7 shows a notional representation of another example of a BCA mark comprising a plurality of pits.

For example, as shown in FIG. 7, pits 58 adjacent to a BCA mark boundary 56 may not extend the full predetermined pit length 44 and instead may be shortened to obtain the desired pattern. Alternatively, a pit pattern 100 may contain no partial pits or land regions.

Figure 8:
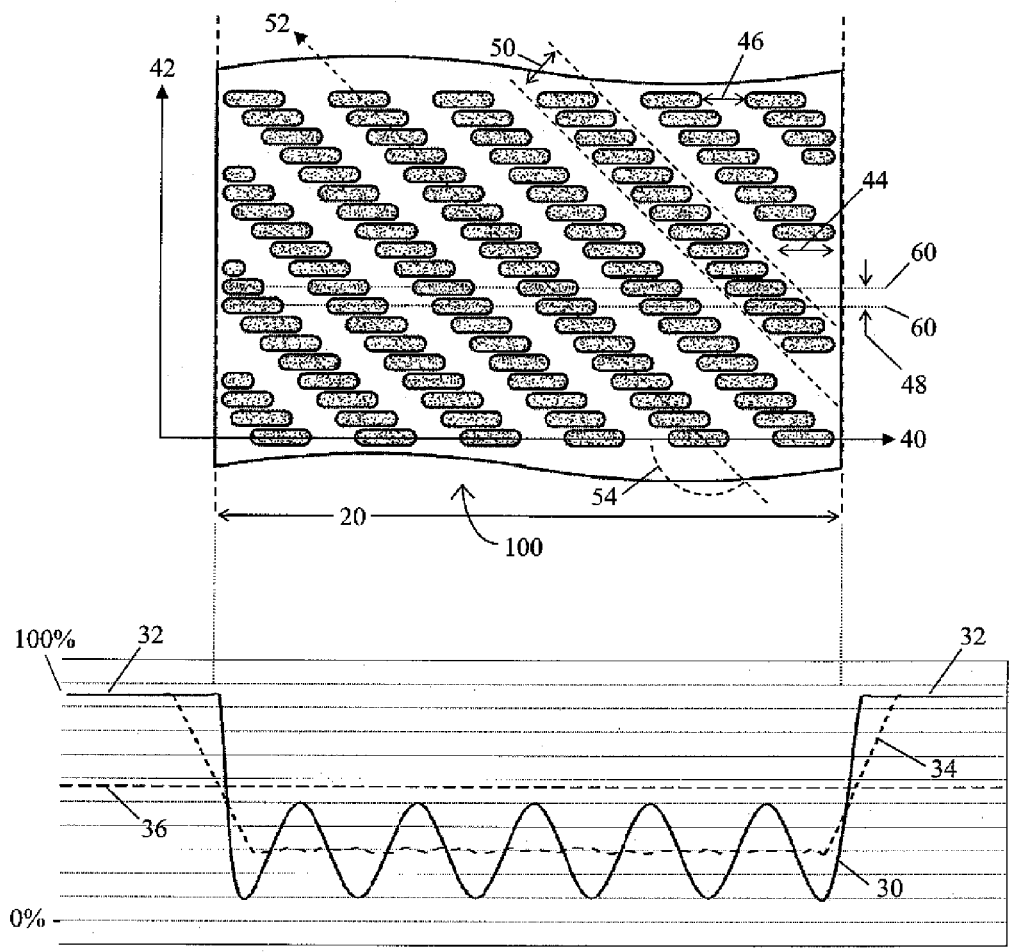
FIG. 8 shows a notional representation of yet another example of a BCA mark comprising a plurality of pits and signals corresponding to the detection of such a BCA mark.

As another example, FIG. 8 shows a BCA mark 20 comprising a plurality of pits 38 formed in a microstripe 50 pattern having a reduced track pitch 48 between pit tracks 60 and with an angle 54 between the microstripe direction 52 and the track direction 40 within the range of 45° to 135°.

FIG. 8 also notionally shows signals detected when the BCA mark 20 is read. As shown, the raw signal 30 from the photodetector reading the geometric pit pattern 100 of the microstripes 50 results in a LPF signal 34 that has a high contrast between the areas outside the BCA mark 32 and in the BCA mark 20. Therefore, a lower threshold 36 value may be used to detect the presence of the BCA mark.

Figure 9:
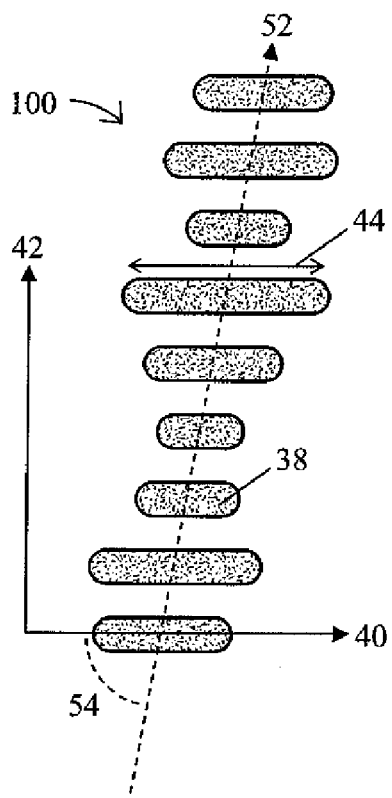
FIG. 9 shows a notional representation of an example of a microstripe pit array.

In another example, shown in FIG. 9, microstripes 50 may be formed of pits 38 having varying lengths 44 along the track direction 40. In this example, the pits are aligned by their midpoints along the microstripe direction 52.

Figure 10:
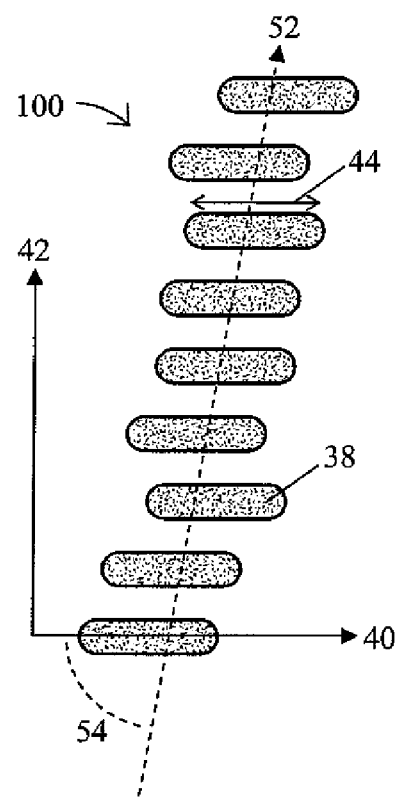
FIG. 10 shows a notional representation of another example of a microstripe pit array.

In yet another example, shown in FIG. 10, microstripes may comprise pits 38 which are not precisely aligned along the microstripe direction 52 by their midpoints or other geometric feature, but which are generally aligned along the microstripe direction 52. In this example, the microstripe direction 52 is defined by an average alignment of the pits 38 and may vary from microstripe to microstripe or may be configured consistently from microstripe to microstripe. In the example shown in FIG. 10, the length 44 of each of the pits 38 is consistent, however, the length 44 of the pits 38 may vary, as shown in FIG. 9.

It will be recognized that a microstripe comprised in a BCA mark may be configured in a shape other than a linear alignment of pits. For example, a microstripe may comprise a plurality of pits aligned along a curved line, along a closed geometric path (circle, rectangle, etc.), a plurality of lines, etc.

It will also be recognized that a BCA mark may comprise a pattern of pits other than a plurality of microstripes. In other words, the BCA mark may be formed by any one or two dimensional array of pits. For example, the BCA mark may comprise a plurality of pits arranged in a lattice pattern, a checkerboard pattern, a random pattern, a diamond pattern, etc.

In addition, it will be recognized that the techniques of this application are not limited to embossed information layers and can be used in manufacturing of read-only type discs, recordable discs, rewritable discs, hybrid discs, discs readable from both disc sides, discs having multiple information layers, high-density discs, etc. As one example, a plurality of pits may be recorded by a laser in a BCA of a write-once or rewriteable information layer to form a BCA mark.

The above specific embodiments are illustrative, and many variations can be introduced on these embodiments without departing from the spirit or scope of the disclosure. For example, elements and/or features of different illustrative embodiments may be combined with each other and/or substituted for each other within the scope of this disclosure.

This disclosure is based on U.S. Provisional Application No. 61/331,250, entitled "OPTICAL RECORDING MEDIUM AND BCA RECORDING METHOD AND APPARATUS" and filed May 4, 2010, the entire contents of which are incorporated herein by reference.

What is claimed is:

1. An optical recording medium comprising
an information layer including a burst cutting area and a data area and
a BCA code, in the burst cutting area, comprising a BCA mark, wherein
the BCA mark comprises a plurality of pits arrayed along one or more pit tracks within the BCA mark and
the information layer includes a reflective layer formed over at least the plurality of pits, and
the plurality of pits arrayed within the at least one BCA mark are each formed with a pit length measured along a pit track direction corresponding to a predetermined nominal BCA pit length,
the plurality of pits arrayed within the BCA mark are each spaced apart from one another along the pit track direction by a land region, each land region within the BCA mark being configured with a land length measured along the pit track direction corresponding to a predetermined nominal BCA land length, and
the nominal BCA pit length is equal to or longer than the nominal BCA land length.

2. The optical recording medium of claim 1, wherein a light reflectance within the BCA mark is less than a predetermined required level, the predetermined required level being a predetermined portion of a light reflectance outside the BCA mark.

3. The optical recording medium of claim 1, wherein the plurality of pits arrayed within the BCA mark are each formed with a pit length measured along a pit track direction corresponding to a predetermined nominal BCA pit length.

4. The optical recording medium of claim 2, wherein at least one pit located at an edge of the BCA mark has a pit length measured along the pit track direction that is less than the predetermined nominal BCA pit length.

5. The optical recording medium of claim 1, wherein the plurality of pits arrayed within the BCA mark are each spaced apart from one another along a pit track direction by a land region, each land region within the BCA mark being configured with a land length measured along the pit track direction corresponding to a predetermined nominal BCA land length.

6. An optical recording medium comprising
an information layer including a burst cutting area and a data area and
a BCA code, in the burst cutting area, comprising a BCA mark, wherein
the BCA mark comprises a plurality of pits arrayed along one or more pit tracks within the BCA mark and the information layer includes a reflective layer formed over at least the plurality of pits, and wherein
each of the plurality of pits has an individual pit length measured along a pit track direction,
the plurality of pits arrayed within the BCA mark are each spaced apart from one another along the pit track direction by a land region, each land region having an individual land length measured along the pit track direction, and
at least one of an individual pit length and an individual land length is determined randomly for each of the respective pits and land regions.

7. An optical recording medium comprising
an information layer including a burst cutting area and a data area and
a BCA code, in the burst cutting area, comprising a BCA mark, wherein
the BCA mark comprises a plurality of pits arrayed along one or more pit tracks within the BCA mark and the information layer includes a reflective layer formed over at least the plurality of pits, and wherein the plurality of pits are arranged along two or more pit tracks and a BCA track pitch measured in a radial direction between adjacent pit tracks within the BCA mark corresponds to, or is less than, a nominal data area track pitch between adjacent pit tracks in the data area.

8. The optical recording medium of claim 1, wherein the plurality of pits are embossed into the optical recording medium by a stamper.

9. An optical recording medium including
an information layer including a burst cutting area;
a BCA mark formed in the burst cutting area, the BCA mark comprising a plurality of pits; and
a reflective layer of the information layer formed over at least the plurality of pits, wherein
the plurality of pits are arrayed along at least two radially spaced apart pit tracks,
a pit pattern specifies a predetermined nominal positional relationship between a particular pit and a most adjacent pit in an adjacent pit track, and each of the plurality of pits within the BCA mark are arrayed within the BCA mark according to the pit pattern.

10. The optical recording medium according to claim 9, wherein the predetermined nominal positional relationship is such that an angle between a track direction and a direction from the any one of the plurality of pits to the most adjacent pit is within a range of 45° to 135°.

11. The optical recording medium of claim 9, wherein the plurality of pits arrayed within the BCA mark are each formed with a pit length measured along a pit track direction corresponding to a predetermined nominal BCA pit length.

12. The optical recording medium of claim 9, wherein the plurality of pits arrayed within the BCA mark are each spaced apart from one another along a pit track direction by a land region, each land region within the BCA mark being configured with a land length measured along the pit track direction corresponding to a predetermined nominal BCA land length.

13. The optical recording medium of claim 9, wherein the at least two pit tracks are spaced apart by a nominal BCA track pitch measured in a radial direction and the nominal BCA track pitch corresponds to a nominal data area track pitch between adjacent pit tracks in the data area.

14. The optical recording medium of claim 9, wherein the at least two pit tracks are spaced apart by a nominal BCA track pitch measured in a radial direction and the nominal BCA track pitch is less than a nominal data area track pitch between adjacent pit tracks in the data area.

15. The optical recording medium of claim 9, wherein
the plurality of pits arrayed within the BCA mark are each formed with a pit length measured along a pit track direction corresponding to a predetermined nominal BCA pit length,
the plurality of pits arrayed within the BCA mark are each spaced apart from one another along the pit track direction by a land region, each land region within the BCA mark being configured with a land length measured along the pit track direction corresponding to a predetermined nominal BCA land length, and
the nominal BCA pit length is equal to or longer than the nominal BCA land length.

16. The optical recording medium of claim 9, wherein
the plurality of pits arrayed within the BCA mark are each formed with a pit length measured along a pit track direction,
the plurality of pits arrayed within the BCA mark are each spaced apart from one another along the pit track direction by a land space, each land space within the BCA mark being configured with a land length measured along the pit track direction, and
a sum of the pit lengths of each of the plurality of pits is greater than or equal to a sum of the land lengths of each of the land spaces within the BCA mark.

17. An optical recording medium including
an information layer including a burst cutting area;
a BCA mark formed in the burst cutting area, the BCA mark comprising a plurality of pits arrayed according to a pit pattern and along at least two radially spaced apart pit tracks; and
a reflective layer of the information layer formed over at least the plurality of pits, wherein
the pit pattern specifies an allocation of the plurality of pits into at least two microstripes,
the at least two microstripes each include one pit per pit track, each particular pit of the plurality of pits being allocated to a same microstripe as a most adjacent pit to the particular pit in an adjacent pit track,
a direction between adjacent pits within each of the at least two microstripes corresponds to a nominal microstripe direction, and
the nominal microstripe direction forms an angle with a pit track direction within a range of 45° to 135°.

18. The optical recording medium of claim 17, wherein at least one microstripe includes a first pit and a second pit, the first pit having a first pit length measured along a pit track direction different than a second pit length of the second pit measured along the pit track direction.

* * * * *